(12) United States Patent
Mital et al.

(10) Patent No.: US 8,515,965 B2
(45) Date of Patent: Aug. 20, 2013

(54) CONCURRENT LINKED-LIST TRAVERSAL FOR REAL-TIME HASH PROCESSING IN MULTI-CORE, MULTI-THREAD NETWORK PROCESSORS

(75) Inventors: Deepak Mital, Orefield, PA (US); Mohammed Reza Hakami, Bethlehem, PA (US); William Burroughs, Macungie, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/403,468

(22) Filed: Feb. 23, 2012

(65) Prior Publication Data

US 2012/0158729 A1    Jun. 21, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707, and a continuation-in-part of application No. 13/046,717, filed on Mar. 12, 2011, and a continuation-in-part of application No. 13/046,719, filed on Mar. 12, 2011, now Pat. No. 8,321,385.

(60) Provisional application No. 61/486,811, filed on May 17, 2011.

(51) Int. Cl.
*G06F 17/30* (2006.01)

(52) U.S. Cl.
USPC .......................................... 707/747; 707/770

(58) Field of Classification Search
None
See application file for complete search history.

(56) References Cited

U.S. PATENT DOCUMENTS

| | | | |
|---|---|---|---|
| 4,622,631 A | 11/1986 | Frank et al. | |
| 5,623,698 A | 4/1997 | Stephenson et al. | |
| 5,892,766 A | 4/1999 | Wicki et al. | |
| 5,893,120 A * | 4/1999 | Nemes | 1/1 |
| 5,909,695 A | 6/1999 | Wong et al. | |
| 5,920,900 A * | 7/1999 | Poole et al. | 711/216 |
| 5,924,098 A * | 7/1999 | Kluge | 1/1 |
| 5,943,283 A | 8/1999 | Wong et al. | |
| 5,974,421 A | 10/1999 | Krishnaswamy et al. | |
| 6,038,630 A | 3/2000 | Foster et al. | |
| 6,052,697 A | 4/2000 | Bennett et al. | |
| 6,115,802 A | 9/2000 | Tock et al. | |
| 6,195,335 B1 | 2/2001 | Calvignac et al. | |
| 6,247,105 B1 * | 6/2001 | Goldstein et al. | 711/170 |

(Continued)

Primary Examiner — Neveen Abel Jalil
Assistant Examiner — Michael K Tamaru (57) ABSTRACT

Described embodiments process hash operation requests of a network processor. A hash processor determines a job identifier, a corresponding hash table, and a setting of a traversal indicator for a received hash operation request that includes a desired key. The hash processor concurrently generates a read request for a first bucket of the hash table, and provides the job identifier, the key and the traversal indicator to a read return processor. The read return processor stores the key and traversal indicator in a job memory and stores, in a return memory, entries of the first bucket of the hash table. If a stored entry matches the desired key, the read return processor determines, based on the traversal indicator, whether to read a next bucket of the hash table and provides the job identifier, the matching key, and the address of the bucket containing the matching key to the hash processor.

18 Claims, 6 Drawing Sheets

(56) References Cited

U.S. PATENT DOCUMENTS

| | | |
|---|---|---|
| 6,567,564 B1 | 5/2003 | van der Wal |
| 6,636,932 B1 | 10/2003 | Regev et al. |
| 7,085,911 B2 | 8/2006 | Sachedina et al. |
| 7,089,346 B2 | 8/2006 | Cebulla et al. |
| 7,234,018 B1 | 6/2007 | Purcell et al. |
| 7,287,046 B2 | 10/2007 | Bulka et al. |
| 7,461,208 B1 | 12/2008 | Caprioli et al. |
| 7,596,142 B1 | 9/2009 | MacAdam |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0073617 A1* | 4/2004 | Milliken et al. ............... 709/206 |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0256783 A1 | 11/2006 | Ayrapetian et al. |
| 2006/0294126 A1* | 12/2006 | Ganjoo ......................... 707/101 |
| 2007/0016756 A1 | 1/2007 | Hsieh et al. |
| 2007/0226798 A1 | 9/2007 | Sibert |
| 2008/0162793 A1 | 7/2008 | Chu et al. |
| 2010/0260198 A1 | 10/2010 | Rojas-Cessa et al. |
| 2011/0307659 A1* | 12/2011 | Hans et al. .................... 711/114 |

* cited by examiner

CONCURRENT LINKED-LIST TRAVERSAL FOR REAL-TIME HASH PROCESSING IN MULTI-CORE, MULTI-THREAD NETWORK PROCESSORS

CROSS-REFERENCE TO RELATED APPLICATIONS

This application claims the benefit of the filing date of U.S. provisional application No. 61/486,811 filed May 17, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010 now U.S. Pat. No. 8,255,644, Ser. No. 12/782,411 filed May 18, 2010 now U.S. Pat. No. 8,407,707, Ser. No. 13/046,717 filed Mar. 12, 2011, and Ser. No. 13/046,719 filed Mar. 12, 2011 now U.S. Pat. No. 8,321,385, the teachings of which are incorporated herein in their entireties by reference.

The subject matter of this application is related to U.S. patent application No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, and Ser. No. 13/359,690 filed Jan. 27, 2012, the teachings of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors implemented as an SoC having multiple processing modules might typically classify an incoming packet to determine which of the processing modules will perform operations for the particular packet or flow of packets. Typical packet classification algorithms might perform a hashing operation on a portion of the packet data to determine a flow identifier of the packet. The hash value might be employed as an index into a lookup table storing identifiers of the various flows that are active within the network processor. In a typical network processor, millions of flows might be active at a given time and the storage requirements for the lookup table can become large. For example, a hash processor might need to traverse large linked lists for the lookup tables, and performance degradation is correlated to the size of the linked lists. Thus, efficient hash processors need improved processing and management of large linked lists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of processing hash operation requests of a network processor. A hash processor determines a job identifier for a received hash operation request that includes a desired hash key, the hash table that corresponds to the received request, and a setting for a traversal indicator for the received request. The hash processor concurrently generates a read request for a first hash bucket of the hash table, and provides the job identifier, the hash key and the traversal indicator to a read return processor. The read return processor stores the hash key and the traversal indicator in a job memory and stores, in a return memory, entries of the first hash bucket of the hash table. If one of the stored entries matches the desired hash key, the read return processor determines, based on the traversal indicator, whether to read a next bucket, if any, of the hash table and provides the job identifier, the matching hash key, and an address of the bucket containing the matching hash key to the hash processor.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Embodiments of the present invention provide a method of processing hash operation requests of a network processor. A hash processor determines a job identifier for a received hash operation request that includes a desired hash key, the hash table that corresponds to the received request, and a setting for a traversal indicator for the received request. The hash processor concurrently generates a read request for a first hash bucket of the hash table, and provides the job identifier, the hash key and the traversal indicator to a read return processor. The read return processor stores the hash key and the traversal indicator in a job memory and stores, in a return memory, entries of the first hash bucket of the hash table. If one of the stored entries matches the desired hash key, the read return processor determines, based on the traversal indicator, whether to read a next bucket, if any, of the hash table and provides the job identifier, the matching hash key, and an address of the bucket containing the matching hash key to the hash processor.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| SDWRR | Smooth Deficit Weighted | CRC | Cyclic Redundancy Check |

TABLE 1-continued

| IP | Round-Robin Internet Protocol | RAT | Reassembly Active Tracking |
|---|---|---|---|

Figure 1:
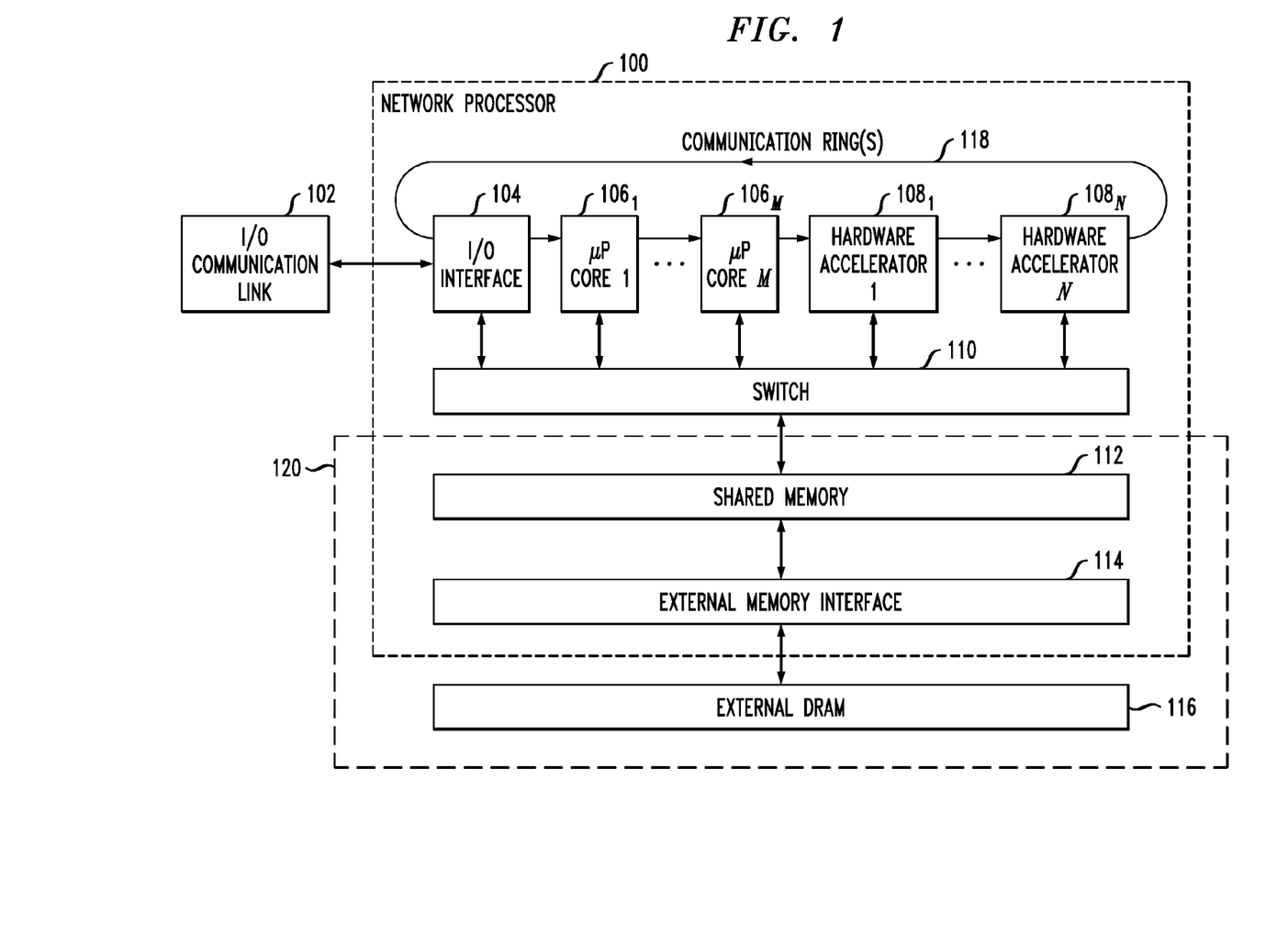
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts for each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, and blocks might be available in various predetermined sizes. For example, the blocks might typically be in one of the following sizes: 256, 2048, 16384, and 65536 bytes. The MMB might operate substantially as described in related U.S. patent application Ser. No. 12/963,895 filed Dec. 9, 2010, and Ser. No. 13/359,690 filed Jan. 27, 2012, which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the MPP. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

Figure 2:
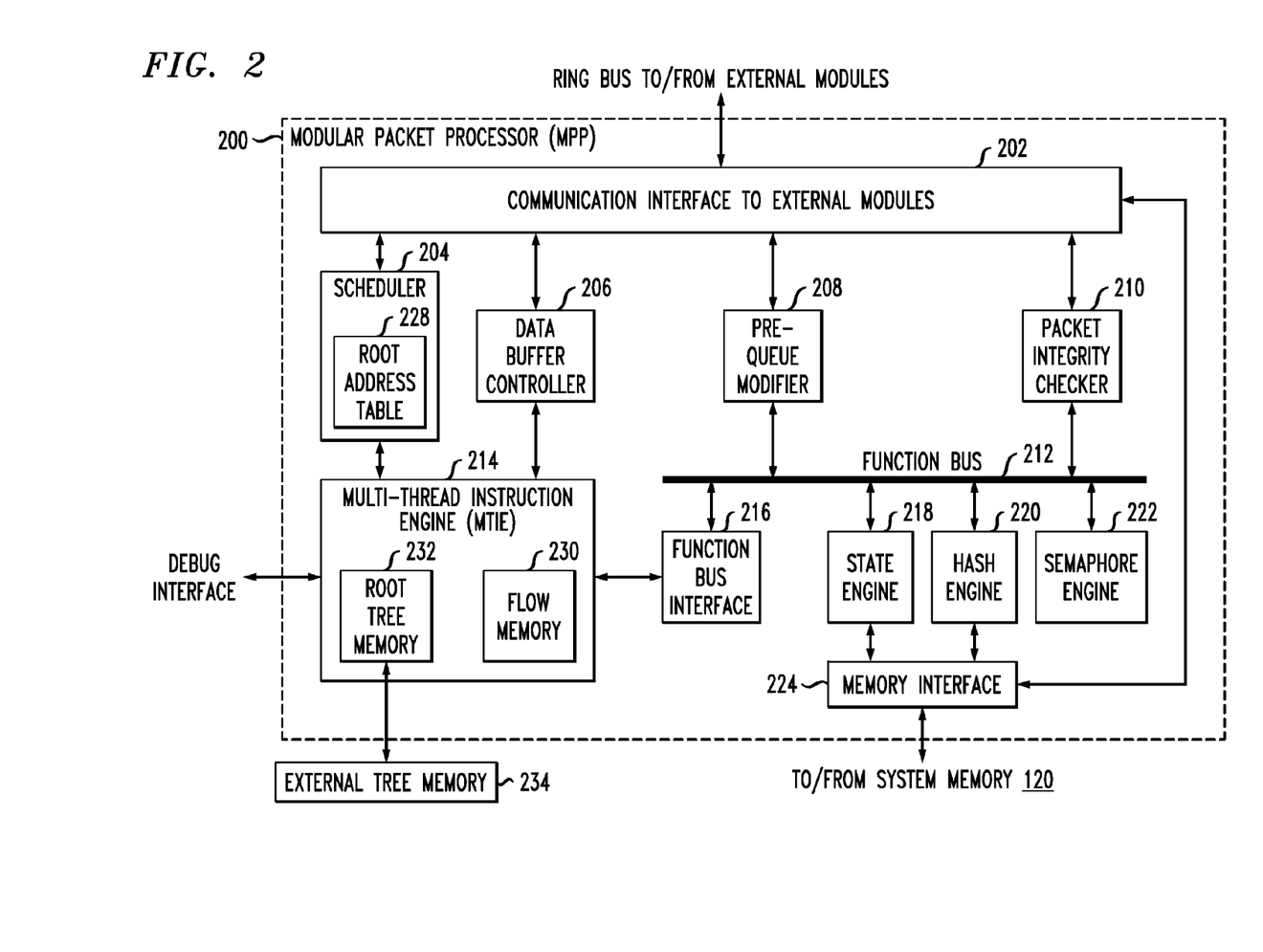
FIG. 2 shows a block diagram of a modular packet processor submodule of the network processor of FIG. 1 in accordance with exemplary embodiments.

FIG. 2 shows a block diagram of an exemplary MPP 200, in accordance with embodiments of the present invention. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

The various sub-modules of MPP 200 shown in FIG. 2, such as Multi-thread Instruction Engine (MTIE) 214, Pre-Queue Modifier (PQM) 208, Packet Integrity Checker (PIC) 210, interface to communication interface 202, Scheduler (SCH) 204, Semaphore Engine (SEM) 222, Data Buffer Controller (DBC) 206, external tree memory 234, Function Bus Interface (FBI) 216, and function bus 212, root address table 228, flow memory 230 and State Engine (SENG) 218 might each operate substantially as described in related U.S. patent application Ser. No. 13/046,719 filed Mar. 12, 2011.

MPP 200 might typically receive input tasks via a task ring such as described in U.S. patent application Ser. No. 12/782,379 filed May 18, 2010. Additionally, MPP 200 might receive a timer event via a timer ring. Receiving a task or receiving a timer event results in a context being generated in MPP 200 corresponding to the received task or timer event. Upon receiving a task, MPP 200 reads the task from system memory 112, for example via communication interface 202 and memory interface 224. MPP 200 might track a virtual flow identifier (vflow ID) and an index (vflow Index) with each output task, indicative of what one(s) of cores 106 or accelerators 108 operate on a data packet after MPP 200 has finished its processing. Communication interface 202 generates an output task based on the vflow ID and vflow Index and the output task is transmitted, for example via a task ring, to the subsequent destination module. An input task might result in the generation of multiple output tasks. As described herein, MPP 200 maintains task order between input and output, such that output tasks are generated in the order in which the input tasks are received by MPP 200, and thus also the order in which the corresponding contexts are started in MPP 200.

SCH 204 starts a new context when new tasks are received by MPP 200. SCH 204 receives a Task ID (TID) that identifies the received task and starts a context by allocating a context number to associate with that task. The TID and context number might be passed on to other modules of MPP 200 when the context is started. A context is associated with this TID and context number until SCH 204 receives an indication that processing of the context is terminated. SCH 204 might maintain a Classification Completion List (CCL) such as described in related U.S. patent application Ser. No. 12/975,880 filed Dec. 22, 2010.

In general, MPP 200 might perform hash functions to classify packets received by network processor 100, and to identify a flow corresponding to a given packet. Hash table operations might be carried out by Hash Engine (HE) 220. HE 220 receives hash operation requests from Function Bus Interface (FBI) 216 over function bus 212. HE 220 might generally execute the hash operation requests in the order in which it receives them on the function bus. Hash tables employed by HE 220 are stored in system memory 112, via memory interface 224. Embodiments of HE 220 might implement up to 1024 independent hash tables. Each hash table might be allocated dedicated static memory at system startup of network processor 100, but might also be dynamically allocated additional memory over time as network processor 100 operates. In some embodiments, additional memory is allocated dynamically to a hash table in 256B blocks.

As shown in FIG. 2, HE 220 is coupled to MTIE 214 through FBI 212. HE 220 incorporates one or more hash tables for key-based operations. HE 220 might perform various hash table operations such as searching a hash table for a key match and returning an associated value, inserting a new entry value, updating an existing value, or deleting an existing value. HE 220 might operate independently of other processing modules of network processor 100. As will be described, each hash operation request might include an index value and a key value. The index value corresponds to a given hash table, and the key value is used to find the potential matching key in the corresponding hash table. Each hash table includes one or more multi-entry buckets, with each entry including a value and a key. Each bucket also has a link that points to a next bucket in the search linked list.

Figure 3A:
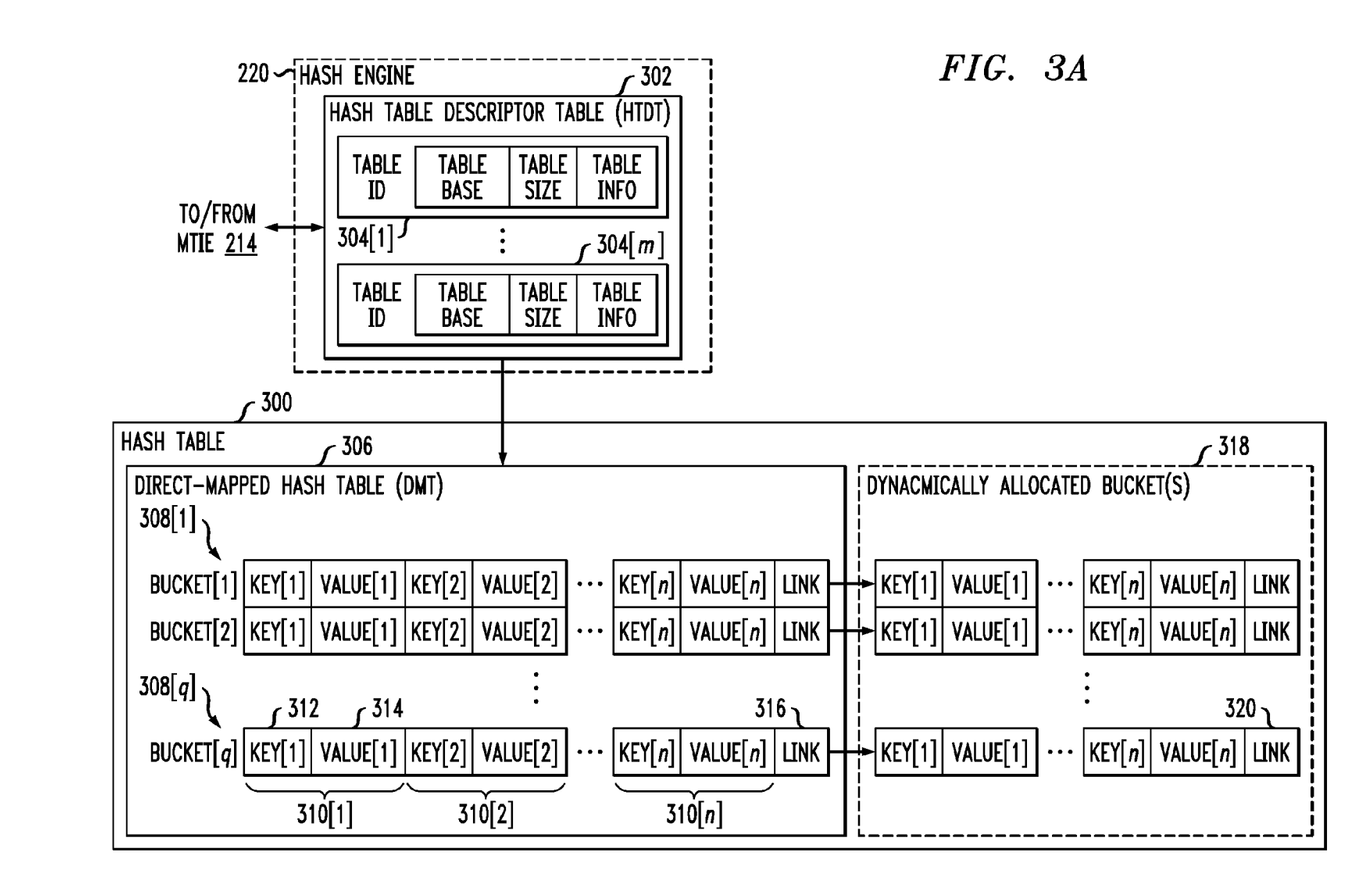
FIG. 3A shows an exemplary block diagram of various data structures of a hash engine of the modular packet processor of FIG. 2 in accordance with exemplary embodiments.

MTIE 214 might generate a hash key and a hash table search entry point ("table index") to search a given hash table. MTIE 214 might also generate a table identifier ("tableID") to identify a particular hash table to search. As shown in FIG. 3, HE 220 might use the tableID as an index into an embedded Hash Table Descriptor Table (HTDT) 302 to determine a corresponding table base address, table size, a maximum number of memory blocks that might be dynamically allocated for this table by the MMB, and other data, shown as HTDT entries 304[1]-304[m]. Each HTDT entry 304[1]-304[m] maps to a corresponding Direct-Mapped hash Table (DMT) of HE 220, shown as DMT 306. DMT 306 is used by HE 220 at startup of network processor 100.

DMT 306 might include a number of "buckets", shown as buckets 308[1]-308[q], where each bucket is the hash table search entry point corresponding to the table index value generated by MTIE 214 and the table base, table size and table info data stored in a corresponding one of HTDT entries 304[1]-304[m]. In some embodiments of the present invention, each bucket might be 64 bytes long. As shown in FIG. 3, each bucket 308[1]-308[q] might contain up to n entries, shown as 310[1]-310[n]. In some embodiments of the present invention, each bucket might contain four table entries (e.g., n=4). Each entry 310[1]-310[n] might typically contain: (i) a key value, 312, that is compared to the hash key generated by MTIE 214, and (ii) a data value, 314, that might include various data, such as (timer & data, name, timer & name). Each entry 310[1]-310[n] might also include an entry valid indicator (not shown) that indicates the corresponding entry contains valid key and result data. Each bucket 308[1]-308[q] might include a link entry, 316, that includes an address of a subsequently allocated bucket, shown as 318.

As shown in FIG. 3, a hash table is an array of {Key, Result} entries in one or more buckets, for example shown as hash buckets 308[1]-308[q], addressed by a table index that is computed by a hash-function employing a hash key. Common hash table operations include (1) inserting an entry into the hash table, (2) looking up an entry in the hash table and (3) deleting an entry from the hash table. Each entry in the hash table, shown as entries 310[1]-310[n], includes an entry value, shown as value 314, that is identified by an associated hash key, shown as key 312.

Multiple hash keys might map to one hash table index. In embodiments of the present invention, a uniform hashing-function is employed to more uniformly distribute hash key associations among the table indices. The number of hash keys mapped to a given table index might be determined by a probability distribution given the total number of table indices and the number of entries in the hash table. The number of entries in the table varies over time based on factors such as network traffic.

Typical operation requests to hash engine 220 might include "insert", "search" and "delete" operations. A typical operation request might include a table ID value that indicates which hash table is to be searched, a table index value that determines a point of entry to the hash table, a key value that is compared against entries in the hash table starting at the table index and going until a match is found or until the hash table is exhausted. As shown in FIG. 3, Hash Table Descriptor Table (HTDT) 302 stores the size, shape and bucket data for each hash table (table ID) of HE 220. HTDT 302 stores definitions of the boundaries of each hash table.

Each hash table listed in HTDT 302 corresponds to at least one bucket within Direct-Mapped hash Table (DMT) 306. DMT 306 provides a "starting point" for a hash table search that is constructed from a linked list of one or more statically allocated buckets, shown as buckets 308[1]-308[q], and potentially one or more dynamically allocated buckets, shown as dynamically allocated buckets 318. As described herein, the various statically allocated and dynamically allocated buckets might be stored in system memory 120.

As shown in FIG. 3, each bucket in DMT 306 includes a link, shown as link 316. Link 316 provides a pointer to a next bucket in a search linked list for a given hash table. As new dynamic buckets 318 are allocated to a given hash table, link 320 at the end of the search linked list is updated to point to the newly allocated bucket. As shown in FIG. 3, each bucket 308[1]-308[q] includes one or more entries 310[1]-310[n]. Each entry 310 of a given bucket includes a corresponding hash key 312 and value 314. Each bucket 308 also includes link 316 that links to a next bucket in the search linked list for each hash table.

Figure 3B:
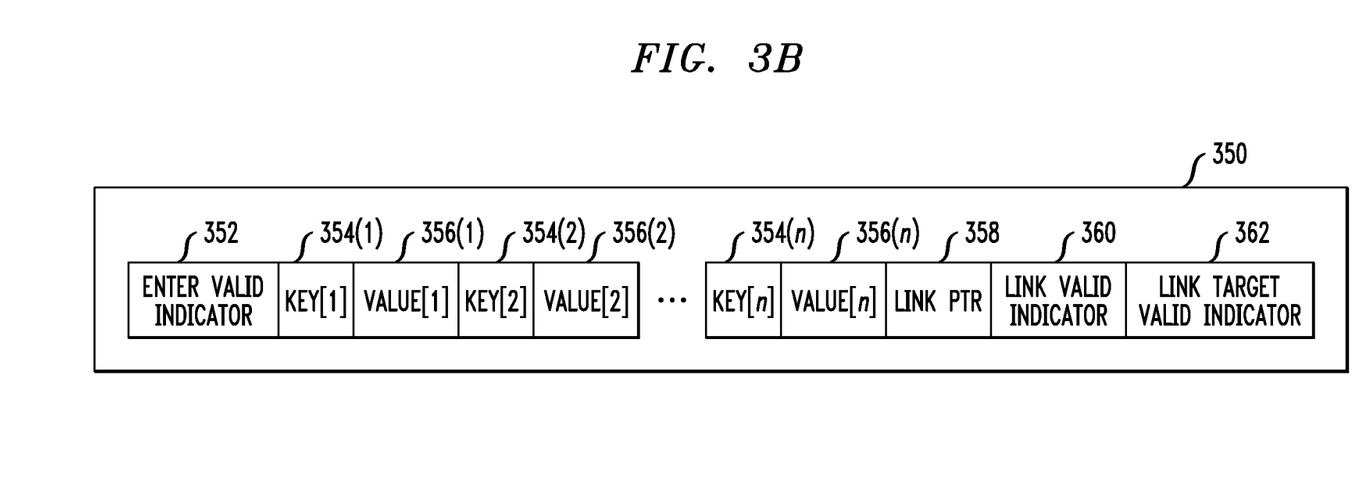
FIG. 3B shows an exemplary block diagram of a hash table data structure of the hash engine of the modular packet processor of FIG. 2 in accordance with exemplary embodiments.

Although not shown in FIG. 3A, link 316 might include one or more control indicators, for example a link valid indicator and a link target valid indicator. The link valid indicator might indicate whether link 316 points to an allocated bucket in system memory 120. The link target valid indicator might be set once data is written into the next bucket corresponding to link 316. FIG. 3B shows an exemplary data structure for a hash table bucket 350. As shown in FIG. 3B, each bucket might include up to n key and value pairs, shown as keys 354(1)-354(n) and values 356(1)-356(n). Link pointer 358 might include an address of a next bucket in the hash table, for example an address for a memory location in system memory 120. Link valid indicator 360 indicates whether link pointer 358 points to an allocated bucket in system memory 120. Link target valid indicator 362 indicates that data is written into the next bucket corresponding to link pointer 358. In some embodiments, n is equal to 4 and each bucket is 64 bytes, where keys 354(1)-704(n) are 8-byte values, values 356(1)-356(n) are 7-byte values, link pointer 358 is a 30-bit value, link valid indicator 360 is a 1-bit flag, and link target valid indicator 362 is a 1-bit flag.

There is at least one bucket in DMT 306 corresponding to each hash table of HE 220. In some embodiments, HE 220 might support up to 1024 hash tables. As shown, DMT 306 includes an array of buckets 308[1]-308[n]. DMT 306 is accessed based on fields stored in HTDT 302, such as the table base and table size fields. The table base value corresponds to the address of the first bucket in the search list for a given hash table. If one of the entries 310[1]-310[n] in the bucket corresponding to the table base value matches the hash key, no additional searching is required. If a match is not found in the bucket corresponding to the table base value, and the bucket corresponding to the table base value has one or more additional buckets linked to it, for example if the link target indicator is set, the search continues through a search linked list of buckets based on link value 316.

A given hash table might change in size as entries are added or deleted in the hash table. When entries are deleted from the hash table, HE 220 removes invalid entries ("holes") starting from the head of the search linked list. By removing invalid entries, HE 220 reduces the memory required for a given hash table, which correspondingly reduces search time of the hash table. To remove an invalid entry, HE 220 might move the last entry in the last bucket in the search linked list to the invalid entry's place. If there are no more valid entries in the last bucket, then the preceding bucket's link target valid indicator is cleared and, if the last bucket is a dynamically allocated bucket, the memory block containing the bucket might be returned to the MMB.

When a hash table requires an additional bucket, HE 220 checks the current last bucket of the search list. If the link valid indicator is set, and the link target valid indicator is not set, a next bucket is already allocated but has not yet been written with data. The next bucket is then linked into the search list and written with data and key information. If the link valid indicator is not set, HE 220 requests a new memory block from the MMB. Thus, a search linked list can be extended by allowing binding of dynamically allocated buckets to a given hash table search linked list.

During a hash table search, HE 220 determines whether the key received in a hash operation request matches a key from the hash table designated for the hash operation request by HTDT 302 based on the table ID. In described embodiments, the table ID value might be 10-bits, allowing up to 1024 hash tables, each having a corresponding entry in HTDT 302. HTDT 302 might further employ one or more additional control fields in the table info field shown in hash entry 304. For example, the additional control fields might include a valid indicator to indicate whether the hash table corresponding to the table ID value is currently allocated, a table size value that indicates the size of the statically allocated memory for the hash table, the base memory address of the statically allocated memory for the hash table, a current number of dynamically allocated memory blocks allocated to the hash table, and a maximum threshold of dynamically allocated memory blocks allowed for the hash table. The table valid indicator might be set when a hash table corresponding to the table ID is allocated, and might beneficially allow for hash tables to be added or deleted in the background while HE 220 is processing other traffic.

When HE 220 receives a hash operation request, HE 220 searches the corresponding hash table to determine whether an entry exists in the hash table having a matching key value. HE 220 might first compute an address for the hash table location in system memory 120, and then retrieve the hash table data for temporary storage in a cache of HE 220. In some embodiments, the hash table address in system memory 120 might be calculated based on the table ID value included in the hash operation request, the base memory address stored in HTDT 302, and an index offset value.

If an insert operation request is for a hash table not having any entries available, HE 220 requests a new dynamic memory block for the hash table, for example, from the MMB. In a first write operation the new entry is inserted to an entry in a bucket of the new dynamic block and the address of the new bucket is stored in link field 316 of the previous bucket in the hash table linked list. HE 220 might update other control information in the previous bucket, such as the link valid indicator and the link target valid indictor. Once all entries of a first bucket in the dynamic block are occupied, HE 220 might allocate a second bucket out of the dynamic block, in the manner described above. Once all buckets in the dynamic block are filled, HE 220 requests another dynamic block and the process repeats.

When an entry is deleted, depending upon the location of the deleted entry in the hash table linked-list, the delete operation could require between one and three operations. If the deleted entry is the only valid entry in the last bucket of the linked-list, only one operation is performed. In this operation, when the deleted entry is the only valid entry in the last bucket of a list, the bucket is removed from the search linked list by clearing the link valid indicator of the previous bucket. The removed bucket might be made available to be reallocated for other hash operations.

If the deleted entry is in the last bucket of the search list, but is not the last entry in the list, two operations are performed. In the first operation, when the deleted entry is in the last bucket of the list, but it is not last entry of the list, the last valid entry of the search list (e.g., the last entry of the last bucket) is moved to the location of deleted entry. In the second operation, a valid indicator associated with the deleted entry is cleared.

If the deleted entry is not in the last bucket of the linked-list, two or three operations might be performed, depending on the number of entries in the last bucket of the linked-list. In a first write operation, the last entry of the hash table is moved to the location of the deleted entry. In a second write operation, the valid entry indicator of the last entry is reset. If the last bucket has more than one valid entry, the delete operation is complete. If the last bucket had only one entry, a third write operation clears the link target valid entry of the previous bucket in the hash table linked list, and removes the last bucket from the hash table.

In embodiments of the present invention, HE 220 might concurrently perform multiple hash operations. Operations for the same hash table (e.g., table ID) might be performed such that table-modifying operations, such as insert and delete, are performed coherently while non-table-modifying operations, such as lookup, are performed concurrently but are not required to be coherent. Thus, as described herein, a coherent hash operation requires that a subsequent table-modifying hash operation for a given hash table cannot be processed until any prior hash operations for that table are completed. However, a subsequent non-table-modifying operation could be processed once any prior table-modifying operations are completed. HE 220 might allow burst processing of non-table-modifying operations for the same hash table, and might employ a deferring mechanism to allow for coherent operations to be deferred.

In embodiments of the present invention, HE 220 might concurrently receive multiple hash operation requests on separate threads of execution without a requirement of receiving the returns associated with each hash operation. If concurrent operation requests use the same key and index, coherency of processing required. If concurrent operation requests use different keys but alias to the same index, ordered processing is required since, even with distinct keys, the same hash table is processed. Further, operation requests desirably finish execution in the temporal order the operation requests are received by HE 220.

Figure 4:
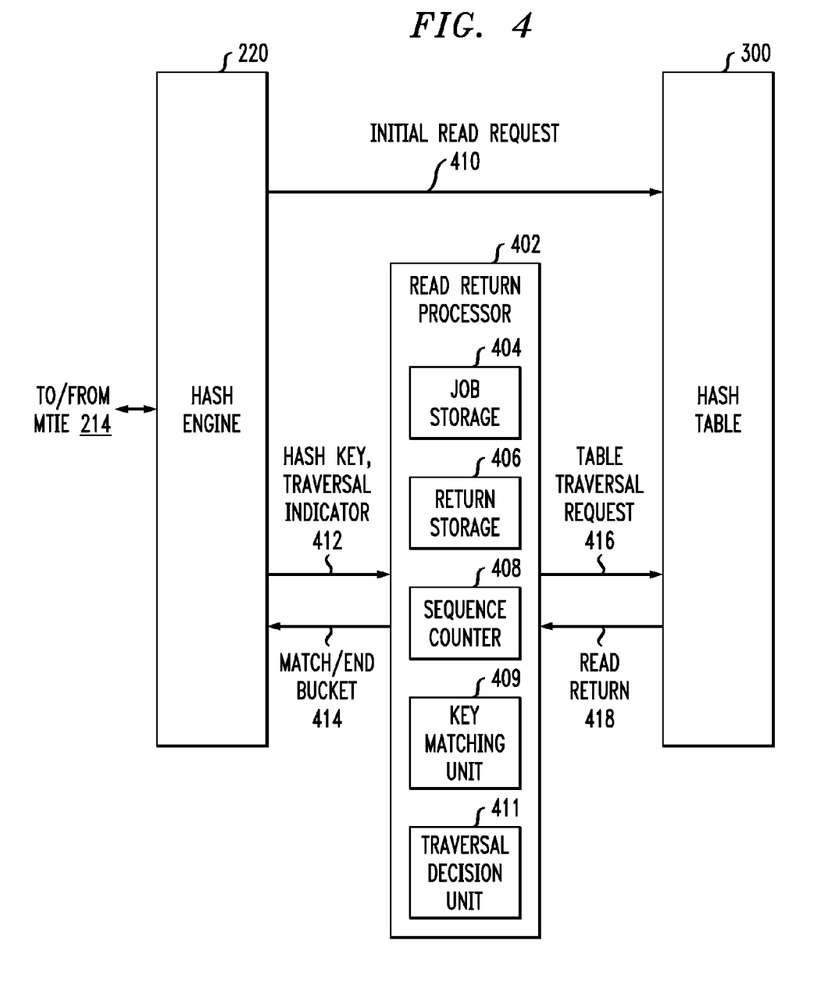
FIG. 4 shows an exemplary block diagram of a read return processor employed by the hash engine to traverse a hash table of FIG. 3 in accordance with exemplary embodiments.

Described embodiments perform concurrent processing of hash table operations by identifying each hash operation by a unique identifier ("jobID"). As shown in FIGS. 3 and 4, HE 220 performs hash operations based on hash operation requests from MTIE 214. HE 220 assigns each received operation request a unique jobID, drawn from a pool of N available jobID values. As described herein, a hash operation request might be either non-table modifying (e.g., a search operation), or table modifying (e.g., an insert operation or a delete operation). Initially, for either a table modifying operation or a non-table modifying operation, HE 220 sends a read request to the corresponding hash table of hash tables 300. As described herein, hash table 300 includes multiple buckets (e.g., as shown in FIG. 3A, direct-mapped buckets 308 and dynamically allocated buckets 318) per hash index value that are bound together as a linked list (e.g., links 316 and 320). Each bucket might typically include multiple entries (e.g., entries 310[1]-310[n]).

Thus, as described herein, one or more hash keys (e.g., key 312) are stored in a linked list of buckets, and thus multiple hash keys map to a given hash index value. If the number of hash keys mapped to a given hash index value becomes large, the linked list of hash buckets becomes large, resulting in a linked list that might take a relatively long amount of time to process. For example, after the initial read request is sent from HE 220 to hash tables 300, embodiments of HE 220 might read a first bucket of the hash table to determine if a matching key is found in the bucket. If a matching key is not found in the bucket, HE 220 might issue one or more subsequent read requests for the same jobID to read one or more subsequent buckets of the hash table, until either a matching key is found, or an end of the table linked list of buckets is reached ("hash table traversal"). Once either a matching key is found or an end of the linked list is reached, if the hash operation is non-table modifying, HE 220 might provide the result of reading the hash table to MTIE 214 and free the jobID for reuse. If the hash operation is table-modifying, HE 220 issues a write request to the corresponding hash table for the jobID. Thus, hash table traversal could cause HE 220 to operate slowly or inefficiently, for example if hash operations are sequentially transferred from HE 220 to hash table 300 or by taking multiple operations of HE 220 to perform a single hash table traversal.

Referring to FIG. 4, decoupling the linked list traversal processing from HE 220 might improve processing of the hash tables. FIG. 4 shows a block diagram of HE 220 and read return processor 402. As shown in FIG. 4, hash table traversal might be performed by read return processor 402. HE 220 generates an initial hash table read request, shown in FIG. 4 as initial read request 410. For example, having HE 220 generate initial read request 410 might enable HE 220 to perform concurrent ordering of hash table operations and jobID assignments. Concurrent with generating initial read request 410, HE 220 transfers the assigned jobID, the desired hash key and a traversal indicator to read return processor 402, shown as data transfer 412. The traversal indicator shows whether the hash operation request corresponds to finding a matching key value (e.g., a hash table search operation) or if the hash operation request corresponds to finding the end of the hash table linked list (e.g., an insert entry operation). Read return processor 402 maintains the hash key and traversal indicator data in job storage 404 as a per-jobID table until either a matching key or the end of the linked list is located. Read return processor 402 returns the address in system memory of the matching bucket or end bucket to HE 220, shown as match/end bucket data 414. HE 220 frees the jobID for reuse.

Thus, by employing read return processor 402, HE 220 advantageously avoids consumption of processing cycles analyzing each of one or more hash table buckets returned by each read operation. Rather, the analysis of each bucket is performed "on-line" by read return processor 402, concurrently with HE 220 performing hash processing for other jobIDs. Read return processor 402 receives control data and hash data from both HE 220 (shown as data 412) and hash tables 300 (shown as read return data 418). Read return data is stored in return storage 406. Both storage units 404 and 406 might have a depth proportional to the number of jobIDs, N, employed by HE 220.

Job storage 404 stores the hash key and the traversal indicator for hash table operations requested by HE 220. For a hash operation, the hash key is transferred from MTIE 214 to HE 220 to look for a potential match in a corresponding one of hash tables 300. Based on the type of hash operation request, HE 220 determines whether the hash operation request is looking for a matching key or the end of the hash table, and sets the traversal indicator accordingly. For example, some hash operations might request only to find a matching key, while other hash operations might request to find a matching key, and also to traverse the entire hash table to the end of the table linked list, past a matching entry. In some embodiments, the traversal indicator might be a binary value, where a value of one indicates that HE 220 is requesting finding a matching key only. A value of zero indicates that HE 220 is requesting traversal to the end of the linked list, past a bucket of the linked list containing a matching key.

Return storage 406 stores link control data, for example in a per-jobID table, extracted from bucket data provided as read return data 418. As described herein, hash buckets are linked together forming a linked list of hash buckets, such as shown in FIG. 3A. As shown in FIG. 3B, each hash bucket might include a corresponding link pointer 358 and link target valid indicator 362. As described, link pointer 358 holds a pointer to the address of the next bucket in the linked list. If link target valid indicator 362 is set, the next bucket pointed to by link pointer 358 contains valid data. If the current bucket is the last bucket in the list, link valid indicator 360 is cleared.

Hash data for a given jobID might be returned from hash table 300 to read return processor 402 in one or more segments over one or more beats, each segment identified by the jobID and a sequence number. Sequence counter 408 might track the received sequence numbers for each jobID. One or more jobIDs might be concurrently processed by read return processor 402, and segments provided from hash tables 300 to processor 402 might include interleaved segments corresponding to multiple jobIDs. Control data for each bucket, such as link pointer 358, link valid indicator 360 and link target valid indicator 362, might be located at a predetermined fixed sequence number for each bucket. Read return processor 402 stores the control data for each jobID in return storage 406. Since the segments might be provided to processor 402 in an interleaved fashion, return storage 406 is employed to maintain the link control data for the buckets corresponding to each active jobID until the last entry of the bucket is received and read return processor 402 determines whether to continue hash table traversal. If traversal continues beyond the initial read request 410 generated by HE 220, one or more subsequent read requests are generated by read return processor 402, shown as table traversal request 416.

Read return processor 402 might be implemented as a multi-stage pipelined hardware accelerator having one or more key matching units 409 and one or more traversal decision units 411. When an entry from a multi-entry hash bucket is received completely (e.g., all segments have been received) by read return processor 402, key matching units 409 reads the hash key associated with the jobID from job storage 404. The hash key read from job storage 404 is compared to the key read from the hash bucket, and an indicator of the comparison result is stored in job storage 404. For example, the comparison result indicator might be implemented as a one bit flag that is set by key matching units 409 if the key in job storage 404 and the key read from the hash bucket match. As described herein, there can be a maximum of one matching key within a given bucket. Thus, once all entries of the bucket are received by read return processor 402, if key matching unit 409 determines a match, the location of the match is stored in job storage 404. Job storage 404 might typically be implemented having a depth corresponding to a maximum number of active jobIDs, and a width corresponding to the size of the hash key and the number of entries in each hash bucket.

As described, sequence counter 408 tracks sequence numbers for returning entries of buckets within a per-jobID table. Thus, sequence counter 408 is implemented with a depth corresponding to the a maximum number of active jobIDs, and a width corresponding to a maximum number of entries in each hash bucket. For example, for embodiments having a maximum of 4 entries per bucket, sequence counter 408 might be two bits wide. When the last entry for a bucket associated with a given jobID is received by read return processor 402, sequence counter 408 might have a value of three.

As the last entry is being processed by key matching unit 409, traversal decision unit 411 receives the traversal indicator (e.g., 412), the link control data (e.g., link pointer 358, link valid indicator 360 and link target valid indicator 362) associated with the current bucket, and the comparison result indicator for the current bucket. Traversal decision unit 411 aggregates this data and determines whether traversal of the hash table linked list should continue. For example, if the traversal indicator is set, HE 220 requested to find a bucket with a matching key for the current jobID. If the comparison result indicator is set, the current bucket contains a matching key, and the traversal of the hash table linked list can complete. Traversal decision unit 411 ends the hash table linked list traversal for the jobID, and read return processor 402 provides HE 220 with the jobID, the hash key and the address of the bucket containing the match. HE 220 then frees the jobID. If the comparison result indicator is not set, but the end of the linked list has not yet been reached, traversal decision unit 411 generates a read request to hash table 300 to read the next bucket in the linked list (e.g., the bucket that corresponds to the address of link pointer 358 for the current bucket), and the entries of the next bucket are compared to the desired hash key value stored in job storage 404. If the comparison result indicator is not set and the end of the linked list is reached (e.g., link valid indicator 360 is not set), traversal decision unit 411 ends the hash table linked list traversal for the jobID, and read return processor 402 provides HE 220 with the jobID, and an indication that no match was found. HE 220 then frees the jobID.

If the traversal indicator is not set, HE 220 requested traversal to the end of the linked list. Regardless of whether a match is found, as long as the end of the linked list is not reached (e.g., link valid indicator 360 is set), traversal decision unit 411 generates subsequent read requests to hash table 300 to read the next bucket in the linked list (e.g., the bucket that corresponds to the address of link pointer 358 for the current bucket), until the last bucket of the linked list is reached (e.g., link valid indicator 360 is not set). Once the end of the linked list is reached, traversal decision unit 411 ends the hash table linked list traversal for the jobID, and read return processor 402 provides HE 220 with the jobID, and one or more of (1) the hash key and the address of a bucket containing the match, (2) the address of the last bucket of the linked list, and (3) an indication that no match was found. HE 220 then frees the jobID.

Figure 5:
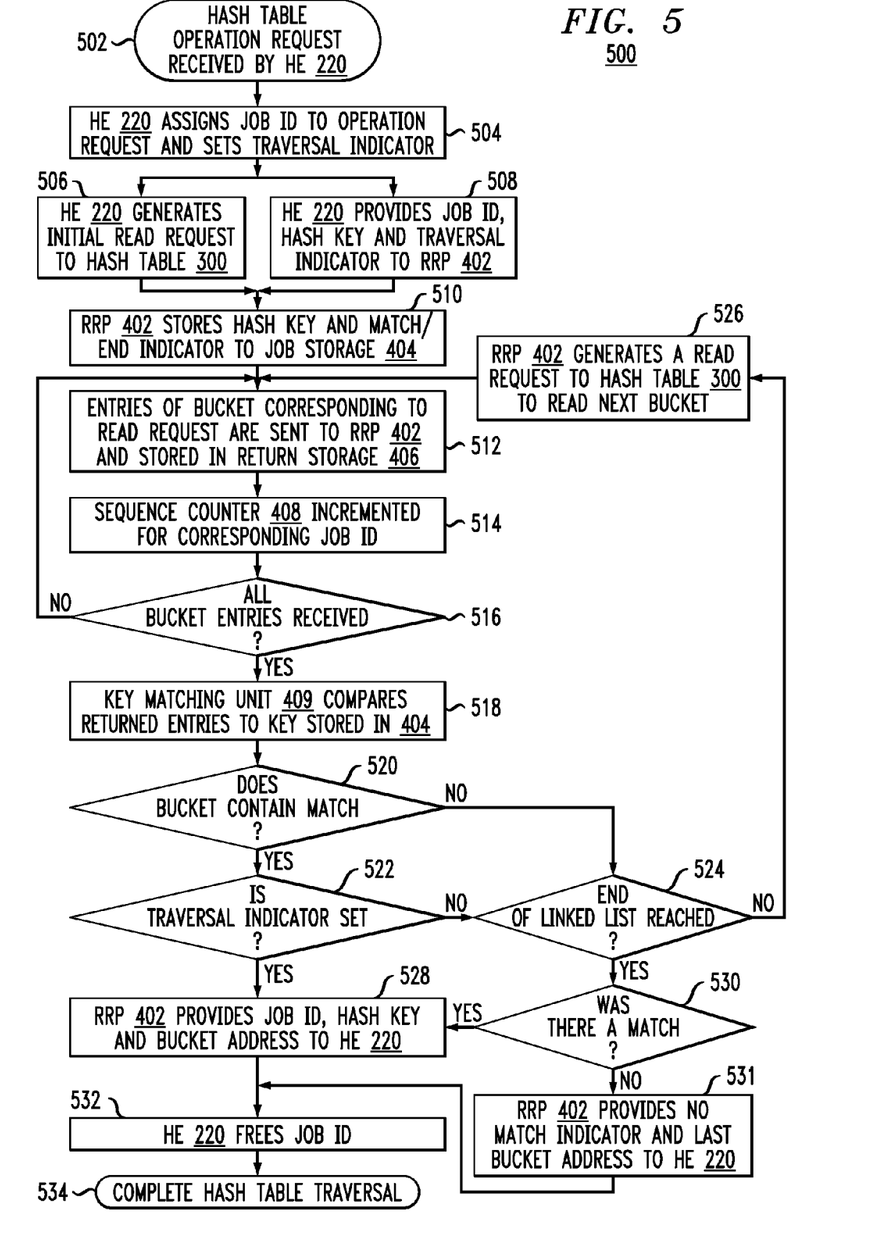
FIG. 5 shows an exemplary flow diagram of a hash table traversal algorithm employed by the hash engine and return processor of FIG. 4 in accordance with exemplary embodiments.

FIG. 5 shows an exemplary flow diagram of hash table traversal process 500. At step 502, a hash table traversal operation is initiated, for example by MTIE 214 requesting a hash table operation from HE 220. At step 504, HE 220 assigns a jobID to the hash operation request. As described herein, process 500 might process operations for multiple jobIDs concurrently. At step 506, HE 220 generates the initial read request to hash table 300 and, concurrently with step 506, at step 508, HE 220 provides the jobID, the desired hash key, and the traversal indicator to read return processor 402. At step 510, read return processor 402 stores the hash key and the traversal indicator in a per-jobID table of job storage 404. At step 512, read return processor 402 receives segments of the entries of the first bucket of the hash table linked list (e.g., the bucket corresponding to the initial read request of step 506). At step 514, sequence counter 408 updates its count for segments of the bucket entries received corresponding to the given jobID.

At step 516, if all segments of all entries of the current bucket are received by read return processor 402 from hash table 300 (for example, based on the value of sequence counter 408 for the jobID), process 500 proceeds to step 518. Otherwise, if at step 516 fewer than all segments of all entries of the bucket have been received by read return processor 402 from hash table 300, then process 500 returns to step 512 to receive additional segments of the bucket entries.

At step 518, key matching unit 409 compares the key values of the received bucket entries to the desired hash key value stored in job storage 404 for the corresponding jobID. At step 520, if the desired hash value matches a hash value of one of the entries, process 500 proceeds to step 522. At step 522, traversal decision unit 411 determines whether the traversal indicator is set for the jobID. If, at step 522, the traversal indicator is set for the jobID, then HE 220 requested a match, without traversing to the end of the linked list, and process 500 proceeds to step 528. At step 528, read return processor 402 provides the jobID, the hash key and the address of the bucket containing the key match to HE 220. At step 532, HE 220 frees the jobID for reuse, and at step 534, process 500 completes. If, at step 522, the traversal indicator is not set for the jobID, then HE 220 requested the operation traverse to the end of the linked list whether or not a match is found, process 500 proceeds to step 524 to determine whether the last bucket of the linked list has been reached.

If, at step 520, the current bucket does not contain a match to the hash key value in job storage 404 for the corresponding jobID, then, at step 524, traversal decision unit 411 determines whether the end of the linked list for the hash table has been reached, for example, based on the value of link valid indicator 360, for the current bucket. If, at step 524 the end of the linked list has been reached, then at step 530, read return processor 402 determines whether a match occurred for a previous bucket in the linked list. If, at step 530, a match was not found, at step 531, read return processor 402 provides an indication that no match was found, and the address of the last bucket of the linked list, to HE 220. If, at step 530, a match was found for a previous bucket, at step 528, read return processor 402 provides the jobID, the hash key and the address of the bucket containing the key match, and, if the traversal indicator is not set, the address of the last bucket in the linked list, to HE 220. At step 532, HE 220 frees the jobID for reuse, and at step 534, process 500 completes. If, at step 524, the end of the linked list has not been reached, at step 526 read return processor 402 generates a read request for a subsequent bucket of the linked list, for example, based on the value of link pointer 358. Process 500 returns to step 512 to receive entries for the new bucket from hash table 300.

Thus, as described herein, embodiments of the present invention provide a method of processing hash operation requests of a network processor. A hash processor determines a job identifier for a received hash operation request that includes a desired hash key, the hash table that corresponds to the received request, and a setting for a traversal indicator for the received request. The hash processor concurrently generates a read request for a first hash bucket of the hash table, and provides the job identifier, the hash key and the traversal indicator to a read return processor. The read return processor stores the hash key and the traversal indicator in a job memory and stores, in a return memory, entries of the first hash bucket of the hash table. If one of the stored entries matches the desired hash key, the read return processor determines, based on the traversal indicator, whether to read a next bucket, if any, of the hash table and provides the job identifier, the matching hash key, and an address of the bucket containing the matching hash key to the hash processor.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of processing a hash operation request by a plurality of processing modules of one of a plurality of network processors, said method comprising:
by a hash processor of the network processor:
determining (i) a job identifier for a received hash operation request having a desired hash key, (ii) one of a plurality of hash tables corresponding to the received hash operation request, and (iii) a setting for a traversal indicator corresponding to the received hash operation request, wherein the traversal indicator comprises a single bit flag, wherein:
setting the flag indicates that the hash processor requested a hash operation to search for a first matching hash key without traversing to a last bucket of the hash table, and
clearing the flag indicates that the hash processor requested a hash operation to search for one or more matching hash keys and to traverse to the last bucket of the hash table;
determining whether one or more of the hash operation requests is one of an insert operation, a delete operation, and a lookup operation;
in response to determining whether the hash operation request is one of an insert operation and a delete operation, clearing the traversal indicator by the hash processor;
in response to determining whether the hash operation request is one of a lookup operation, setting the traversal indicator by the hash processor;
concurrently (i) generating a read request for a first hash bucket of the corresponding hash table, and (ii) providing the job identifier, the desired hash key and the traversal indicator to a read return processor of the network processor;
by the read return processor:
storing the desired hash key and the traversal indicator in a job memory indexed by the job identifier; and
storing (i) one or more entries and (ii) one or more link indicators of the first hash bucket read from the corresponding hash table in a return memory indexed by the job identifier, wherein:
if one of the stored entries of the first hash bucket matches the desired hash key:
determining, based on the traversal indicator, whether to read a next bucket, if any, of the hash table; and
providing the job identifier, the matching hash key, and an address of the bucket containing the matching hash key to the hash processor.

2. The method of claim 1, further comprising:
if none of the retrieved entries of the first hash bucket match the desired hash key:
iteratively, by the read return processor:
generating a read request for a next hash bucket of the corresponding hash table, based on the one or more link indicators of a current hash bucket;
storing (i) one or more entries and (ii) one or more link indicators of the next hash bucket read from the corresponding hash table in a return memory indexed by the job identifier, wherein:
if one of the stored entries of the next hash bucket matches the desired hash key:

determining, based on the traversal indicator, whether to read a next bucket, if any, of the hash table; and providing the job identifier, the matching hash key, and an address of the bucket containing the matching hash key to the hash processor.

3. The method of claim 2, wherein the one or more link indicators comprise a link pointer, a link valid indicator and a link target valid indicator, the method further comprising:

by the hash processor:

storing an address of a next bucket in the hash table to the link pointer of the current bucket;

either:

setting the link valid indicator of the current bucket, thereby indicating presence of a next bucket in the hash table, or clearing the link valid indicator, thereby indicating that the current bucket is a last bucket of the hash table; and either:

upon storing data to the next bucket, setting the link target valid indicator of the current bucket, thereby indicating that the next bucket contains valid data, or clearing the link target valid indicator thereby indicating that the next bucket is empty.

4. The method of claim 2, further comprising:

if all the buckets of the hash table have been read, and no entries match the desired hash key:

sending, by the return processor to the hash processor, the job identifier, an address of the last bucket of the hash table, and an indicator that no matching key was found in the hash table.

5. The method of claim 2, further comprising:

sending, by the return processor to the hash processor based on the traversal indicator, (i) the job identifier, (ii) an address of the last bucket of the hash table, (iii) one or more addresses, each address corresponding to a hash bucket containing a matching hash key, and (iv) an indicator that no matching key was found in the hash table.

6. The method of claim 1, further comprising:

freeing, by the hash processor, the job identifier upon completion of the requested hash operation.

7. The method of claim 1, further comprising:

providing, by the hash processor, entry data corresponding to the matching hash key to the requesting one of the plurality of processing modules.

8. The method of claim 1, further comprising:

concurrently processing, by the return processor, read requests for up to N job identifiers, wherein N is a positive integer, and wherein the job memory and the return memory have a depth equal to N, and a width corresponding to a size of a hash key and the number of entries in each bucket of the hash table.

9. The method of claim 8, wherein the step of storing (i) one or more entries and (ii) one or more link indicators of the first hash bucket read from the corresponding hash table in a return memory indexed by the job identifier further comprises:

retrieving, from the corresponding hash table by the return processor, the one or more entries and the one or more link indicators of the bucket for each job identifier in one or more transfer segments, wherein each transfer segment having a corresponding sequence number, and wherein transfer segments are interleaved for multiple job identifiers; and ordering, by the return processor in the return memory, the retrieved one or more transfer segments based on the corresponding job identifier and corresponding sequence number of each segment.

10. The method of claim 9, further comprising:

tracking, by a sequence counter of the return processor, a sequence count value for a last retrieved transfer segment of the one or more retrieved transfer segments for each job identifier, wherein the sequence counter has a depth equal to N, and a width corresponding to a maximum number of entries in each bucket of the hash table.

11. The method of claim 10, wherein the maximum number of entries in each bucket of the hash table is 4.

12. A non-transitory machine-readable medium, having encoded thereon program code, wherein, when the program code is executed by a machine, the machine implements a method of processing a hash operation request by a plurality of processing modules of one of a plurality of network processors, said method comprising:

by a hash processor of the network processor:

determining (i) a job identifier for a received hash operation request having a desired hash key, (ii) one of a plurality of hash tables corresponding to the received hash operation request and (iii) a setting for a traversal indicator corresponding to the received hash operation request, wherein the traversal indicator comprises a single bit flag, wherein:

setting the flag indicates that the hash processor requested a hash operation to search for a first matching hash key without traversing to a last bucket of the hash table, and clearing the flag indicates that the hash processor requested a hash operation to search for one or more matching hash keys and to traverse to the last bucket of the hash table;

determining whether one or more of the hash operation requests is one of an insert operation, a delete operation, and a lookup operation;

in response to determining whether the hash operation request is one of an insert operation and a delete operation, clearing the traversal indicator by the hash processor;

in response to determining whether the hash operation request is one of a lookup operation, setting the traversal indicator by the hash processor;

concurrently (i) generating a read request for a first hash bucket of the corresponding hash table, and (ii) providing the job identifier, the desired hash key and the traversal indicator to a read return processor of the network processor;

by the read return processor:

storing the desired hash key and the traversal indicator in a job memory indexed by the job identifier; and storing (i) one or more entries and (ii) one or more link indicators of the first hash bucket read from the corresponding hash table in a return memory indexed by the job identifier, wherein:

if one of the stored entries of the first hash bucket matches the desired hash key:

determining, based on the traversal indicator, whether to read a next bucket, if any, of the hash table; and providing the job identifier, the matching hash key, and an address of the bucket containing the matching hash key to the hash processor;

if none of the retrieved entries of the first hash bucket match the desired hash key:

iteratively, by the read return processor: generating a read request for a next hash bucket of the corresponding hash table, based on the one or more link indicators of a current hash bucket;
storing (i) one or more entries and (ii) one or more link indicators of the next hash bucket read from the corresponding hash table in a return memory indexed by the job identifier, wherein:
if one of the stored entries of the next hash bucket matches the desired hash key:
determining, based on the traversal indicator, whether to read a next bucket, if any, of the hash table; and providing the job identifier, the matching hash key, and an address of the bucket containing the matching hash key to the hash processor.

13. The non-transitory machine-readable medium of claim 12, wherein the one or more link indicators comprise a link pointer, a link valid indicator and a link target valid indicator, the method further comprising:
by the hash processor:
storing an address of a next bucket in the hash table to the link pointer of the current bucket;
either:
setting the link valid indicator of the current bucket, thereby indicating presence of a next bucket in the hash table, or
clearing the link valid indicator, thereby indicating that the current bucket is a last bucket of the hash table; and
either:
upon storing data to the next bucket, setting the link target valid indicator of the current bucket, thereby indicating that the next bucket contains valid data, or
clearing the link target valid indicator thereby indicating that the next bucket is empty;
if all the buckets of the hash table have been read, and no entries match the desired hash key:
sending, by the return processor to the hash processor, the job identifier, an address of the last bucket of the hash table, and an indicator that no matching key was found in the hash table.

14. The non-transitory machine-readable medium of claim 12, wherein the traversal indicator comprises a single bit flag, wherein setting the flag indicates that the hash processor requested a hash operation to search for a first matching hash key without traversing to a last bucket of the hash table, and clearing the flag indicates that the hash processor requested a hash operation to search for one or more matching hash keys and to traverse to the last bucket of the hash table.

15. A network processor, from a plurality of network processors, having a plurality of processing modules and at least one shared memory, said network processor performing hash operations, said network processors comprising:
a hash processor configured to:
determine (i) a job identifier for a received hash operation request having a desired hash key, (ii) one of a plurality of hash tables corresponding to the received hash operation request and (iii) a setting for a traversal indicator corresponding to the received hash operation request, wherein the traversal indicator comprises a single bit flag, wherein:
setting the flag indicates that the hash processor requested a hash operation to search for a first matching hash key without traversing to a last bucket of the hash table, and
clearing the flag indicates that the hash processor requested a hash operation to search for one or more matching hash keys and to traverse to the last bucket of the hash table;
determine whether one or more of the hash operation requests is one of an insert operation, a delete operation, and a lookup operation;
in response to determining whether the hash operation request is one of an insert operation and a delete operation, clear the traversal indicator by the hash processor;
in response to determining whether the hash operation request is one of a lookup operation, set the traversal indicator by the hash processor;
concurrently (i) generate a read request for a first hash bucket of the corresponding hash table, and (ii) provide the job identifier, the desired hash key and the traversal indicator to a read return processor of the network processor;
the read return processor configured to:
store the desired hash key and the traversal indicator in a job memory indexed by the job identifier; and
store (i) one or more entries and (ii) one or more link indicators of the first hash bucket read from the corresponding hash table in a return memory indexed by the job identifier, wherein:
if one of the stored entries of the first hash bucket matches the desired hash key:
determine, based on the traversal indicator, whether to read a next bucket, if any, of the hash table; and
provide the job identifier, the matching hash key, and an address of the bucket containing the matching hash key to the hash processor.

16. The network processor of claim 15, further comprising:
if none of the retrieved entries of the first hash bucket match the desired hash key, the read return processor is further configured to:
iteratively:
generate a read request for a next hash bucket of the corresponding hash table, based on the one or more link indicators of a current hash bucket;
store (i) one or more entries and (ii) one or more link indicators of the next hash bucket read from the corresponding hash table in a return memory indexed by the job identifier, wherein:
if one of the stored entries of the next hash bucket matches the desired hash key:
determine, based on the traversal indicator, whether to read a next bucket, if any, of the hash table; and
provide the job identifier, the matching hash key, and an address of the bucket containing the matching hash key to the hash processor;
if all the buckets of the hash table have been read, and no entries match the desired hash key:
send, to the hash processor, the job identifier, an address of the last bucket of the hash table, and an indicator that no matching key was found in the hash table.

17. The network processor of claim 15, wherein the one or more link indicators comprise a link pointer, a link valid indicator and a link target valid indicator, the method further comprising:
by the hash processor:
storing an address of a next bucket in the hash table to the link pointer of the current bucket;
either:

setting the link valid indicator of the current bucket, thereby indicating presence of a next bucket in the hash table, or clearing the link valid indicator, thereby indicating that the current bucket is a last bucket of the hash table; and either:

upon storing data to the next bucket, setting the link target valid indicator of the current bucket, thereby indicating that the next bucket contains valid data, or clearing the link target valid indicator thereby indicating that the next bucket is empty, wherein the traversal indicator comprises a single bit flag, wherein the flag indicates whether the hash processor requested a hash operation to search for a first matching hash key without traversing to a last bucket of the hash table or that the hash processor requested a hash operation to search for one or more matching hash keys and to traverse to the last bucket of the hash table.

18. The network processor of claim 15, wherein the network processor is implemented in an integrated circuit.

* * * * *